N. METZ.
THREAD WINDING MACHINE.
APPLICATION FILED NOV. 27, 1908.
933,092.
Patented Sept. 7, 1909.
2 SHEETS—SHEET 2.
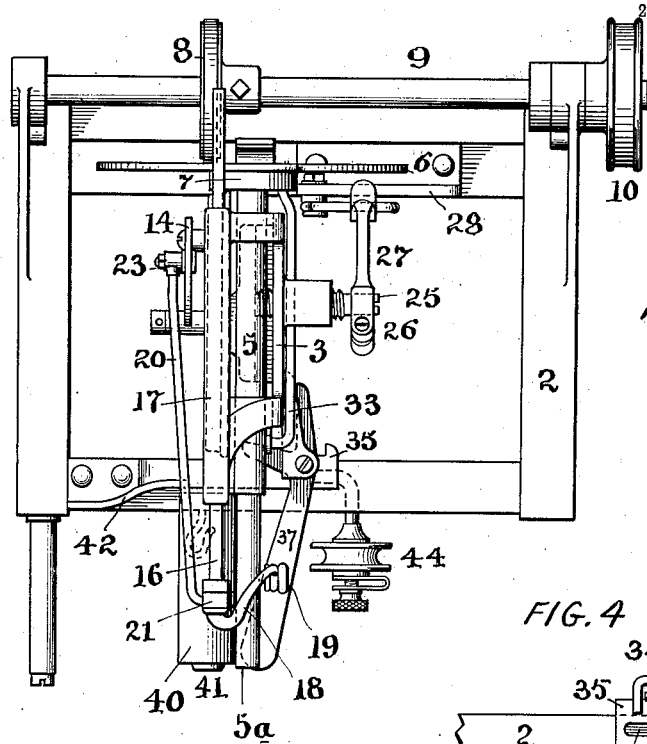
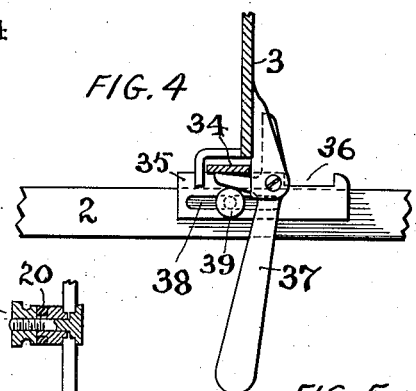
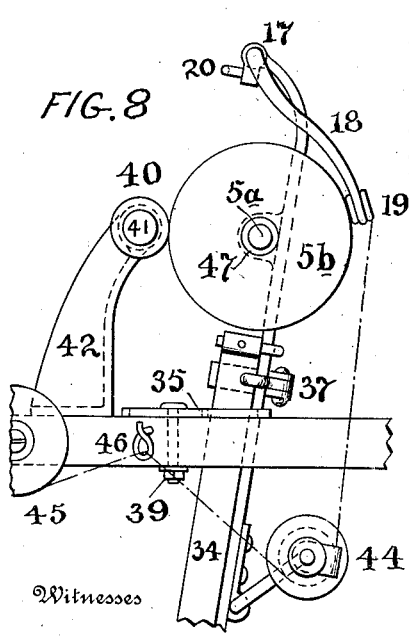
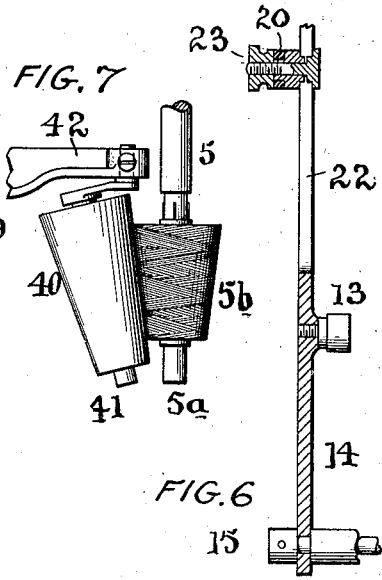
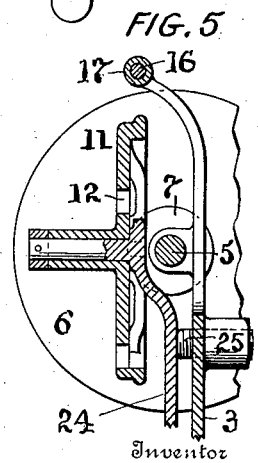
Witnesses
Daniel Webster, Jr.
A. Rettig.
Inventor
Nathaniel Metz
By
Attorney

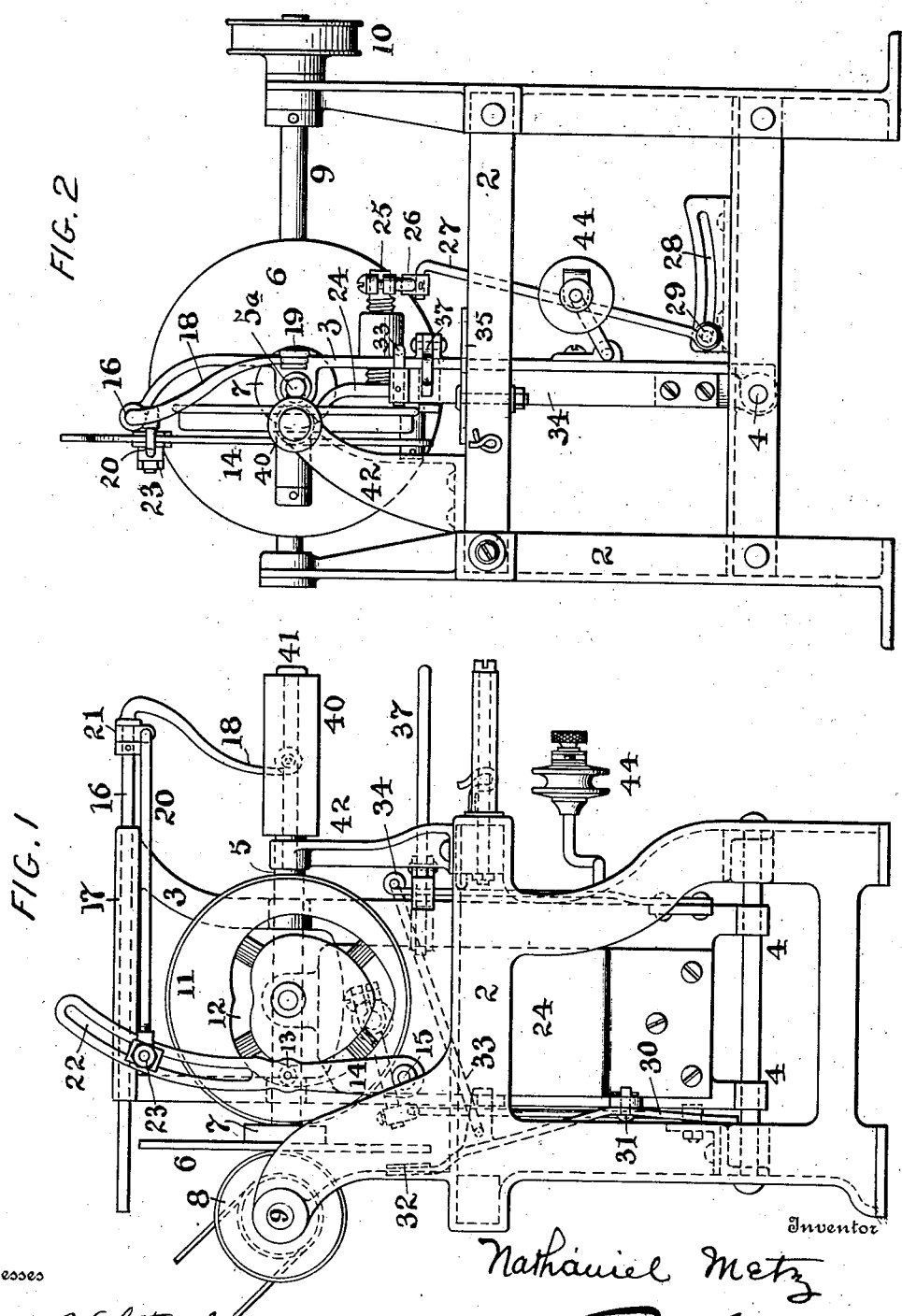

UNITED STATES PATENT OFFICE.

NATHANIEL METZ, OF LANSDALE, PENNSYLVANIA, ASSIGNOR OF ONE-HALF TO RALPH SCHAFENACKER, OF NORTH WALES, PENNSYLVANIA.

THREAD-WINDING MACHINE.

933,092.          Specification of Letters Patent.      Patented Sept. 7, 1909.

Application filed November 27, 1908. Serial No. 464,516.

*To all whom it may concern:*

Be it known that I, NATHANIEL METZ, of the city of Lansdale, county of Montgomery, State of Pennsylvania, have invented an Improvement in Thread-Winding Machines, of which the following is a specification.

My invention has reference to thread winding machines and consists of certain improvements which are fully set forth in the following specification and shown in the accompanying drawings which form a part thereof.

The object of my invention is to provide a construction of machine which shall have a capacity for winding thread upon tubular cores in ball form, rectangular or conical in general shape, the thread being wound diagonally back and forth compactly upon itself and in which the adjacent threads of any layer are caused to lie parallel and close together with the same regularity, throughout the successive layers of the ball.

My invention is more particularly directed to certain improvements in the machine for automatically carrying out the above specified objects and consists of the following features in an organized machine of the character described: An improved means for traversing the thread guide consisting of a cam actuated traversing lever, a friction driven disk for operating the cam, a driving shaft and driving friction wheel, and an intermediate combined driven and driving friction disk between the driving friction wheel and the friction driven disk for operating the traversing cam; further, in the said features when combined with means for adjusting the friction driven disk for operating the traversing cam relatively to the combined driven and driving disk whereby the speed of the traversing cam may be varied; further in the above instrumentalities when provided with means for automatically shifting the traversing devices relatively to the driving wheel to change the speed thereof inversely as the diameter of the ball increases and also for independently changing the speed of rotation of the traversing cam to compensate for use of various thicknesses of threads; and further in stop motion devices which operate to automatically throw the driven friction disk out of contact with the driving friction wheel when the ball reaches a predetermined diameter.

My invention also comprehends many details of construction which, together with the features above specified, will be better understood by reference to the drawings, in which:

Figure 1 is a side elevation of a thread winding machine embodying my invention; Fig. 2 is a front elevation of the same; Fig. 3 is a plan view of same; Figs. 4, 5 and 6 are sectional views illustrating details of the machine; Fig. 7 is a plan view illustrating the winding of a conical ball, and Fig. 8 is an enlarged view corresponding to a portion of Fig. 2 but showing the manner of feeding the thread to the ball and also showing a large ball in process of formation.

2 is the main frame of the machine and may be made in any suitable manner.

3 is a pivoted frame hinged to a transverse rod or shaft 4 carried by the main frame and upon which the frame 3 may rock and also have a sliding movement in the direction of the axis of the shaft. This frame 3 has journaled upon it a spindle shaft 5 terminating at one end in the spindle 5ᵃ. The other end of the shaft 5 is secured to a driven disk 6 having its hub made into a driven disk 7 of smaller diameter. The driven disk 6 coöperates with a driven friction wheel 8 secured upon a power shaft 9, journaled on the main frame and driven by a belt pulley 10 or in any other suitable manner. The friction wheel 8 is adjustable upon the shaft 9 so that it may be arranged nearer to or farther from the normal center of the disk 6 to make the spindle shaft 5 rotate at any speed desired to suit the requirements of the machine.

34 is a spring plate secured at one side of the frame 3 and its free end presses against the edge of a guide plate 35 having a notch 36 at one end. By means of this spring 34, the frame 3, together with this disk 6, is pressed toward the friction wheel 8 and maintains a contact between said friction wheel and disk 6 during the winding of the ball. The upper end of the spring 34 is connected by a link 33 with a lever 30 which is pivoted to the frame 3 at 31. This lever 30 has its lower end resting against the main frame and the operation is such, that when the frame 3 is shifted to the right (Figs. 2 and 3) to the proper distance, the spring 34 will snap into the recess 36 of the plate 35 and enable the lever 30 to be pulled over so as to shift the frame 3 (to the right of Fig. 1) and withdraw the disk 6 from contact with friction wheel 8, with the result of stopping the rotation of the spindle and the winding operation. The upper end of the lever 30 may be provided with a brake shoe 32 which, when the frame 3 is shifted to stop the machine, may come into contact with the disk 6 and instantly stop its rotation by overcoming the inertia of the rotating disk.

The plate 35 may be secured to the main frame 2, but I prefer to make it adjustable, as indicated in Fig. 4, by providing it with a slot 38 through which a bolt 39 passes to clamp it to the main frame in its adjusted position. The position of the recess 36 in this plate relative to the position of the spring 34 will determine the diameter of the ball to be wound before the machine is stopped, as will be understood from further description of the winding operation.

24 is a spring frame upon which is journaled the frictional driven disk 11 which makes contact with the driving friction disk 7 close to the spindle shaft 5, so that it has a slow speed compared to the speed of the friction wheel 8. The friction disk 11 has formed in it a heart shaped cam 12 in which a roller 13 works, said roller being journaled upon an arm 14, pivoted at 15 to the spring frame 24. The upper end of this arm 14 is provided with a curved slot 22 in which is adjustably clamped a crank pin 23. The crank pin 23 connects with a rod 20, which is universally jointed at 21 with the traversing shaft 16 guided and journaled in a bearing 17 at the uper end of the frame 3. The forward end of this traversing shaft 16 is bent downward to constitute an arm 18 terminating in a thread guide 19 of any suitable construction which normally may be brought into close relation with the winding spindle 5ª, as indicated in Fig. 2. It will be observed that this guide 19 may be swung about the bearing 17 so as to move radially from or to the winding spindle, and at the same time be shifted parallel to the spindle for the purpose of traversing the thread back and forth parallel to the axis of the spindle during the rotation thereof in the act of winding the ball. The traversing action of the guide 19 is due to the operation of the cam 12 upon the pivoted arm 14 and the extent of this traversing operation may be adjusted by adjusting the position of the crank pin 23 in the slotted part 22 of the said arm 14 to change the throw of the reciprocation of the traversing shaft 16. The radial movement of the guide 19 is dependent wholly upon the increasing diameter of the ball being wound, as it rests directly against the circumference of the ball. In practice a paste-board tube is shoved upon the spindle 5ª and the thread is attached thereto during its rotation, said thread leading from the bobbin or spool 45, through a guide 46, then around a tension guide wheel 44 to the thread guide 19, as more fully indicated in Fig. 8. In Fig. 8 I have indicated the paper tube at 47 and the ball of thread which has been wound, at 5ᵇ, and from which it will be seen that the thread guide 19 is resting upon the circumference of this ball. Ordinarily the thread guide is made of porcelain or glass so as to offer as little friction upon the surface of the ball as possible.

42 is a bracket secured to the main frame and carries a shaft 41 upon which is loosely journaled a guide roller 40, usually made of wood. When a cylindrical ball is to be wound the guide roller 40 is a cylinder, as indicated in Figs. 1, 2 and 3. The position of the winding spindle 5ª with respect to the guiding cylinder 40 before the winding begins, is indicated in Figs. 2 and 3, and as the winding proceeds the circumference of the ball rotates in contact with the guiding roller 40 and gradually forces the winding spindle away from the said guide cylinder, and this also causes the frame 3 to be moved to the right (in Figs. 2, 3 and 8). When the ball has reached its maximum diameter, as indicated in Fig. 8, the frame 3 will have moved to such an extent that the spring 34 will have snapped into the recess 36 of the plate 35 to arrest further winding operation, so that the machine automatically stops itself. It will also be observed that, as the diameter of the ball increases, the disk 6 will be shifted under the friction drive wheel 8 so that the latter is in contact therewith at a gradual increasing distance from the center of the spindle shaft 5. By this means the speed of rotation of the spindle and ball is gradually reduced as the diameter of the ball increases, so that the speed of the ball is maintained substantially the same, and consequently the thread is wound under a practically uniform speed.

In cases where the ball is to be wound in conical form, as indicated in Fig. 7, then the guide cylinder 40 is made conical in shape, and is arranged at an angle so that its surface will make contact with the conical surface of the ball. The guiding effect is the same as in the use of the straight cylinder. By making the roller conical in this case, there is less strain upon any portion of the ball in shifting frame 3.

The relation between the rotation of spindle 5ª and the traversing of the thread guide determines whether the threads which are being wound around and back and forth upon the ball shall lie close together, or at a distance apart, and consequently provision is made for adjustment of this relation so as to enable the adjacent threads to be brought into the proper co-relation to form a compact ball, it being preferable that the greatest length of yarn shall be wound upon the ball with the smallest diameter of ball consistent with the elimination of excessive tension during the winding operation. Provision for this adjustment is found in the adjusting screw 25, which extends through the frame 3 and presses against spring frame 24 for changing the point of contact between the driving disk 7 and the driven disk 11. Normally, the driven disk 11 will contact with the driving disk 7 close to the shaft 5, but by means of the adjusting screw said frame 24 may be forced outward away from the frame 3 and the driven disk 11 carried with it so as to coöperate with the driving disk 7 at a greater radial distance from the axis of the shaft 5 than before. It is evident that this adjustment will increase the speed of rotation of the driven disk 11 and consequently will increase the number of reciprocations of the traversing shaft 16 with respect to a given number of revolutions of spindle shaft 5. This will change the angle upon which the threads adjust themselves in being wound about the circumference of the ball. Assuming that the adjacent threads were required to lie close to each other, it is evident that a change in the thickness of the thread to be wound would change the compactness of the ball, and this variation in the thickness of the thread to be wound may be compensated for by adjusting the screw 25 to change the speed of reciprocation of the thread guide. The cam 12 being a heart-shaped cam, is designed to cause the reciprocations to be uniform whereby the thread is subjected to the same character of adjustment in delivery to the ball throughout the entire winding operation. Aside from the hand adjustment last mentioned with respect to the relation between the reciprocations of the thread guide and the speed of rotation of the winding spindle, there is another and important provision required in the winding operation, namely to regulate the traversing operation of the thread guide to suit the increasing diameter of the ball between its minimum and maximum diameters. To provide for this adjustment in an automatic manner, I clamp upon the adjusting screw 25 a crank 26 whose free end is connected to a link 27 extending down to an adjustable connection 29 with a plate having a curved guide 28, as more fully shown in Fig. 2. It will be seen that with this construction and the movement of the frame 3 to the right, in Fig. 2, screw 25 will be turned very slightly and in a very gradual manner with the result that the number of reciprocations of the traversing thread guide is gradually lessened because of the driven disk being gradually adjusted in contact with the disk 7 nearer its center and because of which the speed of rotation of the spindle 5ª is correspondingly decreased. From the construction shown, it is evident that there is a large variation in the speed of the winding spindle 5ª, and that there is also a corresponding change in the speed of reciprocation of the traversing thread guide, but in addition to this latter change there is a further change therein due to the automatic adjustment of the screw 25, which insures the laying of the threads during the operation of winding so that successive coils of the thread do not come over each other as the ball increases in diameter. If this latter adjustment were not provided, there would be a tendency for the adjacent threads on the circumference of the increasing ball to lie on top of one another and thereby lose the compactness of the ball. By the provision of the automatic adjustment herein employed, this defect is overcome and the machine adapts itself to wind a uniform ball for any diameter of thread, size of ball or variation in its diameter. By changing the adjustable connection 29 in the slot 28 so as to remove it farther from the shaft 4 upon which the frame 3 is hinged, the adjustment of the screw 25 may be increased with the same movement of the frame 3, and this will compensate for the difference in thickness of the threads from which the ball is made.

By the organization of parts herein set out, it is evident that capacity is given to the machine for winding a ball in a most perfect manner, with the threads close together irrespective of the size or diameter of the threads employed, or the diameter of the ball produced.

In resetting the machine for winding a new ball, I provide a lever 37, which is hinged to the frame 3 and furnished with a heel which presses upon the spring 34, said lever acting to first force the spring out of the recess 36 of the guide plate 35 and then to shift the frame 3 back to its original position, Figs. 2 and 3. The resetting lever 37 and its associated parts are best shown in Fig. 4.

I have shown my invention in the form which I find excellently adapted for commercial use, but I do not restrict myself to the details thereof, as they may be modified in various ways as will readily occur to one skilled in the art to which my invention pertains.

Having now described my invention, what I claim as new and desire to secure by Letters Patent, is:

1. In a thread winding machine, the combination of a spindle, a combined driven and driving disk secured to the spindle, a power shaft and friction wheel thereon for driving the combined driven and driving disk, a traversing cam having a disk driven by the combined driven and driving disk, a thread guide, and means for traversing the thread guide from the traversing cam.

2. In a thread winding machine, the combination of a spindle, a combined driven and driving disk secured to the spindle, a power shaft and friction wheel thereon for driving the combined driven and driving disk, a traversing cam having a disk driven by the combined driven and driving disk, means for varying the speed of rotation of the traversing cam and disk relatively to the speed of rotation of the combined driven and driving disk, a thread guide, and means for traversing the thread guide from the traversing cam.

3. In a thread winding machine, the combination of a spindle, a combined driven and driving disk secured to the spindle, a power shaft and friction wheel thereon for driving the combined driven and driving disk, a traversing cam having a disk driven by the combined driven and driving disk, a thread guide, means for traversing the thread guide from the traversing cam, and devices for varying the extent of reciprocation of the traversing guide.

4. In a thread winding machine, the combination of a spindle, a combined driven and driving disk secured to the spindle, a power shaft and friction wheel thereon for driving the combined driven and driving disk, a traversing cam having a disk driven by the combined driven and driving disk, a thread guide, means for traversing the thread guide from the traversing cam, and devices for varying the extent of reciprocation of the traversing thread guide, consisting of a pivoted arm operated by the traversing cam, and a rod having an adjustable connection with the pivoted arm to vary its reciprocation.

5. In a thread winding machine, the combination of a spindle, a combined driven and driving disk secured to the spindle, a power shaft and friction wheel thereon for driving the combined driven and driving disk, a traversing cam having a disk driven by the combined driven and driving disk, means for automatically throwing the combined driven and driving disk out of contact with the friction wheel, a thread guide, and means for traversing the thread guide from the traversing cam.

6. In a thread winding machine, the combination of a spindle, a combined driven and driving disk secured to the spindle, a power shaft and friction wheel thereon for driving the combined driven and driving disk, a traversing cam having a disk driven by the combined driven and driving disk, means for automatically throwing the combined driven and driving disk out of contact with the friction wheel, means for automatically arresting the rotation of the combined driven and driving disk when out of contact with the friction wheel, a thread guide, and means for traversing the thread guide from the traversing cam.

7. In a thread winding machine, the combination of a rotating spindle upon which the thread ball is wound, means independent of the ball for positively and directly rotating the spindle, means for traversing the thread movable parallel to and operated by the rotating spindle, and adjusting devices for varying the speed of the means for traversing the thread without affecting the speed of rotation of the spindle.

8. In a thread winding machine the combination of a rotating spindle upon which the thread ball is wound, means independent of the ball for positively and directly rotating the spindle, means for traversing the thread movable parallel to and operated by the rotating spindle, and adjusting devices for automatically varying the speed of the means for traversing the thread without affecting the speed of rotation of the spindle.

9. In a thread winding machine, the combination of a rotating spindle upon which the thread ball is wound, means for rotating the spindle, a friction driving disk on the spindle and rotating with it, a frictionally driven disk receiving motion from the driving disk, a frame in which the spindle is journaled, a frame upon which the driven disk is journaled, a screw for adjusting the two frames relatively to each other to change the positions of contact between the driving and driven disks, a thread guide, and means operated by the driven disk for traversing the thread guide parallel to the surface of the ball.

10. In a thread winding machine, the combination of a rotating spindle upon which the thread ball is wound, means for rotating the spindle, a friction driving disk on the spindle and rotating with it, a frictionally driven disk receiving motion from the driving disk, a pivoted frame in which the spindle is journaled, a guiding roller against which the thread ball presses to move the pivoted frame, a frame upon which the driven disk is journaled, a screw for adjusting the two frames relatively to each other to change the positions of contact between the driving and driven disks, means for automatically adjusting the screw during the movement of the pivoted frame, a thread guide, and means operated by the driven disk for traversing the thread guide parallel to the surface of the ball.

11. In a thread winding machine, the combination of a rotating spindle upon which the thread ball is wound, means for rotating the spindle at a gradually decreasing speed as the thread ball increases in diameter, a pivoted frame carrying the spindle, a spring actuated frame secured to the pivoted frame, a thread guide, means to traverse the thread guide, power transmitting devices for operating the traversing means at variable speeds, and means for regulating the variable speeds to vary the relation between the rotation of the spindle and traversing of the thread guide.

12. In a thread winding machine, the combination of a rotating spindle upon which the thread ball is wound, means for rotating the spindle at a gradually decreasing speed as the thread ball increases in diameter, a pivoted frame carrying the spindle, a spring actuated frame secured to the pivoted frame, a thread guide, means to traverse the thread guide, power transmitting devices for operating the traversing means at variable speeds, and means for automatically regulating the variable speeds to vary the relation between the rotation of the spindle and traversing of the thread guide so as to reduce the traversing speed as the spindle speed is reduced but in an increasing ratio.

13. In a thread winding machine, the combination of a rotating spindle upon which the thread ball is wound, means for rotating the spindle at a gradually decreasing speed as the thread ball increases in diameter, a pivoted frame carrying the spindle, a spring actuated frame secured to the pivoted frame, a thread guide, means to traverse the thread guide, power transmitting devices for operating the traversing means at variable speeds, and means for regulating the variable speeds to vary the relation between the rotation of the spindle and traversing of the thread guide, consisting of a screw carried by the pivoted frame for adjusting the spring actuated frame and power transmitting devices, a lever for the screw, a rod for moving the lever when the pivoted frame is moved, and an abutment support for the rod.

14. In a thread winding machine, the combination of a pivoted frame, a winding spindle carried thereby, a thread guide, traversing devices for traversing the thread guide supported by the pivoted frame, means for adjusting the traversing devices to change their speed, and mechanism dependent upon the movement of the pivoted frame for controlling the means for adjusting the traversing devices.

15. In a thread winding machine, the combination of a pivoted frame, a winding spindle carried thereby, a thread guide, traversing devices for traversing the thread guide supported by the pivoted frame, means for adjusting the traversing devices to change their speed, and mechanism dependent upon the movement of the pivoted frame for controlling the means for adjusting the traversing devices, said mechanism having hand adjustable parts to modify the automatic adjustment of the traversing devices.

16. In a thread winding machine, the combination of a movable pivoted frame, a winding spindle journaled in said frame, power devices for rotating the spindle, spring devices for holding the pivoted frame in operative relation with the power devices during a portion of its movement and for throwing the power devices out of action at the termination of the movement of the pivoted frame, means for controlling the operation of the spring devices and means for delivering thread to the spindle.

17. In a thread winding machine, the combination of a rotating spindle upon which the thread ball is wound, means for rotating the spindle at a gradually decreasing speed as the thread ball increases in diameter, a thread guide, means to traverse the thread guide, power transmitting devices for operating the traversing means at variable speeds, and means for regulating the variable speeds to vary the relation between the rotation of the spindle and traversing of the thread guide.

18. In a thread winding machine, the combination of a rotating spindle upon which the thread ball is wound, means for rotating the spindle at a gradually decreasing speed as the thread ball increases in diameter, a thread guide, means to traverse the thread guide, power transmitting devices for operating the traversing means at variable speeds, and means for automatically regulating the variable speeds to vary the relation between the rotation of the spindle and traversing of the thread guide, whereby the traversing speed is reduced with a reduction of the spindle speed.

19. In a thread winding machine, the combination of a rotating spindle upon which the thread ball is wound, means for rotating the spindle, a thread guide, means for traversing the thread guide parallel to the spindle, automatic adjusting devices for varying the speed of the means for traversing the thread without affecting the speed of rotation of the spindle, and means for reducing the speed of the spindle as the ball being wound increases in diameter.

20. In a thread winding machine, the combination of a rotating spindle upon which the thread ball is wound, means for rota'.ng the spindle, a friction driving disk on the spindle and rotating with it, a frictionally driven disk receiving motion from the driving disk, a pivoted frame in which the spindle is journaled, a fixedly located roller acting as a guide against which the thread ball presses to shift the pivoted frame, a spring frame upon which the driven disk is journaled, a screw for adjusting the two frames relatively to each other to change the positions of contact between the driving and driven disks, a thread guide, and cam and lever devices operated by the driven disk for traversing the thread guide parallel to the spindle.

21. In a thread winding machine, the combination of a pivoted frame, a winding spindle carried thereby, a thread guide, movable both parallel and radially with respect to the spindle, traversing devices for traversing the thread guide supported by the pivoted frame, guiding means against which the thread ball rotates to move the pivoted frame, means to rotate the spindle, and mechanism dependent upon the movement of the pivoted frame for throwing the means for rotating the spindle out of operation.

22. In a thread winding machine, the combination of a movable pivoted frame, a winding spindle upon which the thread ball is wound journaled in said frame, power devices for rotating the spindle at a gradually reducing speed, spring devices for holding the pivoted frame in operation relation with the power devices during a portion of its movement and for throwing the power devices out of action at the termination of the movement of the pivoted frame, means for controlling the operation of the spring devices, means for delivering thread to the spindle, a fixedly located roller against which the ball rotates, and hand controlled devices for resetting the pivoted frame and spring devices into their initial positions.

In testimony of which invention, I have hereunto set my hand.

NATHANIEL METZ.

Witnesses:
A. D. JOHNSON,
A. E. LONG.